US012667211B2

(12) United States Patent
Hilgenberg

(10) Patent No.: US 12,667,211 B2
(45) Date of Patent: Jun. 30, 2026

(54) MULTIPLE-USE DRINKING STRAWS AND THEIR PRODUCTION

(71) Applicant: Hilgenberg GmbH, Malsfeld (DE)

(72) Inventor: Ingo Hilgenberg, Malsfeld (DE)

(73) Assignee: Hilgenberg GmbH, Malsfeld (DE)

( * ) Notice: Subject to any disclaimer, the term of this patent is extended or adjusted under 35 U.S.C. 154(b) by 961 days.

(21) Appl. No.: 17/608,388

(22) PCT Filed: May 5, 2020

(86) PCT No.: PCT/EP2020/062362
§ 371 (c)(1),
(2) Date: Nov. 2, 2021

(87) PCT Pub. No.: WO2020/229218
PCT Pub. Date: Nov. 19, 2020

(65) Prior Publication Data
US 2022/0211199 A1 Jul. 7, 2022

(30) Foreign Application Priority Data
May 14, 2019 (EP) .................................... 19174512

(51) Int. Cl.
*A47G 21/18* (2006.01)
*C03C 17/00* (2006.01)
(Continued)

(52) U.S. Cl.
CPC ............ *A47G 21/18* (2013.01); *C03C 17/004* (2013.01); *C03C 17/009* (2013.01); *C03C 17/30* (2013.01);
(Continued)

(58) Field of Classification Search
CPC .... A47G 21/18; C03C 17/004; C03C 17/009; C03C 17/30; C03C 17/328; C03C 17/005;
(Continued)

(56) References Cited

U.S. PATENT DOCUMENTS 5,112,658 A 5/1992 Skutnik et al.
7,687,654 B2 3/2010 Frohlich et al.
(Continued)

FOREIGN PATENT DOCUMENTS

AU 2018102071 A4 1/2019
CA 3022445 A1 4/2019
(Continued)

OTHER PUBLICATIONS

"Strawgrace Glass Straws with Bamboo Case to go . . . " Amason. co.uk: Kitchen & Home Nov. 8, 2018.
(Continued)

*Primary Examiner* — Steven J Ganey
(74) *Attorney, Agent, or Firm* — Troutman Pepper Locke LLP; Scott D. Wofsy; Gabrielle L. Gelozin

(57) ABSTRACT

The present invention deals with a tube (1) with a tube base body (2) which consists of glass, wherein at least the inside of the tube base body (2) is at least partially covered a hydrophobic coating (3). The use of such tubes (1) as drinking straws leads to multiple use, ecologically friendly drinking straws which meet hygienic requirements and have a good cleanability. The present invention also deals with a process for producing such tubes.

17 Claims, 2 Drawing Sheets

(51) Int. Cl.

| | | |
|---|---|---|
| *C03C 17/30* | (2006.01) |
| *C03C 17/32* | (2006.01) |
| *F16L 9/10* | (2006.01) |

(52) U.S. Cl.
CPC ............ *C03C 17/328* (2013.01); *F16L 9/105* (2013.01); *C03C 17/005* (2013.01); *C03C 2217/445* (2013.01); *C03C 2217/479* (2013.01); *C03C 2217/76* (2013.01)

(58) Field of Classification Search
CPC ........ C03C 2217/445; C03C 2217/479; C03C 2217/76; F16L 9/105
USPC .................................... 239/33, 602, DIG. 19
See application file for complete search history.

(56) References Cited

U.S. PATENT DOCUMENTS

| | | | | |
|---|---|---|---|---|
| 7,806,073 | B2 * | 10/2010 | Brown | .................... B05B 14/49 |
| | | | | 118/326 |
| 8,973,401 | B2 * | 3/2015 | Borrelli | ................. A01N 59/16 |
| | | | | 65/30.13 |
| 2004/0082699 | A1 | 4/2004 | Brown |
| 2006/0029808 | A1 | 2/2006 | Zhai et al. |
| 2009/0069790 | A1 | 3/2009 | Yokley et al. |
| 2012/0034435 | A1 | 2/2012 | Borrelli et al. |
| 2015/0197371 | A1 | 7/2015 | Deckers et al. |
| 2018/0011160 | A1 | 1/2018 | Greiser |
| 2018/0112083 | A1 | 4/2018 | Hayoun et al. |

FOREIGN PATENT DOCUMENTS

| | | | |
|---|---|---|---|
| CN | 104418509 | A | 3/2015 |
| CN | 106811114 | A | 6/2017 |
| CN | 206782357 | U | 12/2017 |
| DE | 10 2007 045 935 | A1 | 4/2009 |
| JP | S52166688 | U | 12/1977 |
| JP | H6-133840 | A | 5/1994 |
| JP | H7-275137 | A | 10/1995 |
| JP | 2003286047 | A | 10/2003 |
| JP | 2013-533839 | A | 8/2013 |
| JP | 3220607 | U | 3/2019 |
| TW | 572182 | U | 1/2004 |
| TW | 201838566 | A | 11/2018 |
| WO | 2012-053655 | A1 | 4/2012 |
| WO | 2014/047697 | A1 | 4/2014 |

OTHER PUBLICATIONS

International Search Report issued in PCT/EP2020/062362, dated Jul. 10, 2020.
English translation of Japanese Office Action dated Dec. 5, 2023, issued during the prosecution of Japanese Patent Application No. JP 2021-568164.
D. Yueguo et al., "Preparation of Low Surface Energy Coating via Photopolymerization", Paint & Coating Industry, Feb. 2015, pp. 44-55.
English language Chinese Office Action dated May 31, 2023, issued during the prosecution of Chinese Patent Application No. CN 2020080035457.X.
English translation of Korean Office Action dated Oct. 30, 2025, issued during the prosecution of Korean Patent Application No. 20217036647.

\* cited by examiner

MULTIPLE-USE DRINKING STRAWS AND THEIR PRODUCTION

CROSS-REFERENCE TO RELATED APPLICATIONS

This application is a U.S. National Phase Application filed under 35 U.S.C. § 371, based on International Patent Application No. PCT/EP2020/062362, filed May 5, 2020, which claims priority to European Patent Application No. 19174512.4, May 14, 2019. The entire contents of these applications are incorporated herein by reference.

The present application relates to drinking straws made of glass for a multiple-use and their production. The inventive multiple-use straws can be used multiple times and their cleanability is improved, and they can even be used in dishwashers. Their production method enables the production of said drinking straws at low cost and with high durability.

Conventional drinking straws are made of hard plastics, allowing very thin walls and very smooth surfaces. Normally, the drinking straws have a kink point, wherein a part of the drinking straw can be bent in a certain direction.

However, a recent EU-regulation prohibits for the future that drinking straws can be produced from single-use materials like plastic in order to avoid plastic waste. Hence, other materials have to be found to produce drinking straws and to meet the ecological requirements by the European Union.

Patent document DE 10 2007 045935 A1 discloses a fertility test with a carrier body, optionally a filter layer with reduced pore size, and optionally it consists of at least two strips, one of which is the reagent layer.

Patent document US 2018/112083 A1 discloses a tube and a coating for the inner wall of the tube.

Patent document US 2006/029808 A1 discloses a super-hydrophobic coating with a water contact angle greater than 150°. The coating can remain superhydrophobic after being immersed in water for one week.

U.S. Pat. No. 5,112,658 A1 discloses coated glass containers having a surface cured composition which is the reaction product of at least one ethylenically unsaturated monoene, a polyene and a curing initiator. The coating is bonded to the exterior or interior surface of a glass container to increase hardness and strength.

Patent document US 2004/082699 A1 discloses durable, weatherable and scratch-resistant coatings provided by compositions comprising a fluorinated component and an adhesion promoter compound. The adhesion promoter compound can include an alkoxy group, a furfuryl-containing ring structure, and a reactive group.

Patent document TWM 572182 discloses drinking straws made of the hollow stalk of a plant, for example reed, wheat or bamboo. The inner surface of said drinking straws can be covered with grease like linseed oil or glutinous rice water in order to make the inner surface of the drinking straw more smooth and durable.

Furthermore, patent document AU 2018102071 A4 discloses ecologically friendly drinking straws made of wheat stems.

However, multiple-used drinking straws have to be cleaned regularly after each use, which however is difficult because of long, cylindrical geometry of drinking straws. In particular in the field of gastronomy, an effective and fast-cleaning of the drinking straws has to be ensured.

Besides the cleaning of the drinking straws with water and cleaning liquid, also the use of small brushes, for example pipe-cleaners, might become necessary to remove tightly adhering remainders of offs or drinks, e.g. fruit particles that might be contained in fruit milkshakes or smoothies. However, said pipe-cleaners can be easily kinked and per se have to be cleaned again, which often does not fulfill the hygienic requirements.

Hence, a typical problem of ecological drinking straws of the prior art is the very difficult cleaning, which can lead to a disgust factor of the users. Furthermore, a quick and efficient cleaning, for example for gastronomical purposes, cannot be ensured.

Accordingly, it is an objective technical problem of the present application to provide multiple-use, ecologically-friendly drinking straws with easy cleanability. Furthermore, it is an objective technical problem of the present application to provide a process for the production of such drinking straws.

This objective technical problem is solved by tubes according to claim 1, a process for producing such tubes according to claim 8 and the use of glass tubes with a hydrophobic coating for drinking straws according to claim 13. Further advancements and preferred embodiments are defined in the dependent claims.

The present invention provides the following aspects, subject-matters and preferred embodiments, which respectively taken alone or in combination, further contribute to solving the objective technical problem of the present invention:

1. Tube with a tube base body which is made of or consists of glass, wherein at least the inside of the tube base body is at least partially covered with a hydrophobic coating.
2. Tube according to item 1, wherein the tube body is made of soda lime glass, borosilicate glass or quartz glass.
3. Tube according to one of the preceding items, wherein the coating comprises a hydrophobic polymeric material.
4. Tube according to item 3, wherein the polymeric material is selected from the group consisting of silanes, silicone oils, halogenated hydrocarbons and anorganic-organic hybrid polymers.
5. Tube according to one of the items 3 or 4, the coating additionally containing an antibacterial agent.
6. Tube according to item 5, said antibacterial agent being selected from the group consisting of silver and copper and their compounds.
7. Tube according to item 6, wherein the antibacterial agent is silver and is elemental or colloidal.
8. Tube according to item 6, the antibacterial agent being silver nitrate.
9. Tube according to one of the preceding items, said tube having an inner diameter between 3 and 10 mm, preferably between 5 and 8 mm.
10. Tube according to one of the preceding items, the tube having a wall thickness between 0.8 and 3 mm, preferably between 1 and 2 mm.
11. Tube according to one of the preceding items, the coating having a thickness of between 0.1 μm and 1000 μm, preferably between 1 μm and 500 μm, more preferably between 10 μm and 100 μm
12. Tube according to one of the preceding items, said tube having a length between 100 and 350 mm, preferably between 120 and 300 mm.
13. Tube according to one of the preceding items, the tube body having a straight cylindrical shape or an angled cylindrical shape or a kinked cylindrical shape.

14. Tube according to one of the preceding items, wherein at least the inside of the tube base body is fully coated with a hydrophobic coating.

15. Tube according to one of the preceding items, wherein the tube base body is fully covered with a hydrophobic coating.

16. Tube according to one of the preceding claims, wherein the glass tube body is hydrophobized, preferably silanized, at least at the portions covered by the hydrophobic coating.

Hence, the glass per se is subjected to hydrophobizing treatment before the coating is applied, to further improve the adhesion of the hydrophilic polymeric coating to the glass.

17. Process for producing a coated glass tube comprising the following steps:
a) providing a glass tube base body;
b) providing a solution or suspension containing a hydrophobic polymer material;
c) contacting the tubular body and the solution or suspension provided in step b) with at least the inner surface of the tubular body;
d) optionally drying the tubular body obtained in step c);
e) heat treating the tube obtained in step c).

18. Process according to item 18, wherein the solution provided in step b) is a solution containing 0.5 to 10% by weight of hydrophobic polymer material, preferably 1.0 to 2.0% by weight, wherein the solvent is preferably water.

19. Process according to item 17 or 18, wherein the hydrophobic polymer material is selected from the group consisting of silanes, silicone oils, halogenated hydrocarbons and anorganic-organic hybrid polymers.

20. Process according to any one of items 17 to 19, the solution in step b) further containing an antibacterial agent.

21. Process according to item 20, wherein the antibacterial agent is selected from the group consisting of silver and copper and their compounds.

22. Process according to item 21, wherein the antibacterial agent is silver and is elemental or colloidal.

23. Process according to item 21, wherein the antibacterial agent is silver nitrate.

24. Process according to one of the preceding items, wherein in step d) a temperature of at least 100° C., preferably at least 200° C., more preferably at least 250° C., is used.

25. Process according to one of the preceding items, the heat treatment in step d) being carried out for at least 5 minutes, preferably at least 15 minutes, more preferably at least 30 minutes, even more preferably at least 60 minutes.

26. Process according to one of the preceding items, wherein step c) comprises immersing the tube in the solution provided in step b). This is therefore dip coating.

27. Process according to one of the preceding items, wherein step c) comprises vaporizing the tube with the solution provided in step b).

28. Process according to one of the preceding items, wherein step c) comprises surface diffusion.

29. Process according to one of the preceding items, wherein the entire tube is coated.

This means that both the inner surface and the outer surface of the tube are coated.

30. Use of a hydrophobic coating for drinking straws made of glass.

31. Use according to item 30, wherein the hydrophobic coating is selected from the group consisting of silanes, silicone oils and halogenated hydrocarbons.

A main aspect of the present invention resides in a tube with a tube base body which consists of glass, wherein at least the inside of the tube base body has a hydrophobic coating.

The hydrophobic coating provides water-repellant properties to the glass base body. Furthermore, it enables efficient drop formation to the relevant parts, i.e. at least the inside of the base body, so that liquid does not spread over a surface of the coating, but is present in the drop-shape, preferably in the form of mini-droplets.

A suitable hydrophobicity of the coating can be accomplished by choosing an appropriate organic or hybrid-organic coating material and can optionally be checked or defined by appropriate measurements or parameters such as by showing a contact angle of a coating with e.g. a water drop of at least 90°, preferably at least 120°, more preferably at least 160°, measurable with a drop shape analyzer like a goniometer.

The hydrophobic coating is preferably made of a hydrophobic polymer.

Said hydrophobic polymeric coating ensures that cleaning liquid entering the interior of the tubes can be easily ejected out of the tube, without any remaining cleaning liquid within the tube, leading to the fact that the tube can be more easily cleaned, as capillary forces and a so-called bottleneck effect can be avoided. Furthermore, it is less likely that dirt accumulates and adheres to the inner surface of the base body. A hydrophobic polymeric coating, especially when subjected to heat-treatment when in contact with the glass tube body during preparation and in particular when selected from suitable polymeric materials, can ensure sufficient bonding and attachment of the coating to the main glass tube body, thereby preventing leakage and therefore health-critical problems.

Because of the hydrophobic behaviour of the coating and consequently avoidance of a bottleneck effect, it can also be avoided that the tubes used as drinking straws drip or release droplets when removed out of a glass of liquid, hence avoiding potential stains of clothes of the user. The bonding strength between the tube base body and the hydrophobic polymeric coating can preferably be further enhanced by prior hydrophobization or water-repellant treatment of the tube base body surface, preferably by silanization at least at portions which are to be covered with hydrophobic coating. Hence, the glass per se is subjected to hydrophobizing treatment before the coating is applied, to further improve the adhesion of the hydrophilic polymeric coating to the glass.

Further, as the hydrophobic coating may provide additional durability, even a cleaning of the tubes in regular dishwashers is feasible.

Furthermore, the hydrophobic coating provides a gloss effect to the glass, improving the acceptance of such glass tubes as drinking straws among users.

Preferably, the inside of the tube base body is fully covered with the hydrophobic coating in order to fully exert the above mentioned advantageous effects.

More preferably, the inside and the outer side of the tube base body are fully covered with the hydrophobic coating. This additionally improves the haptic feeling of the glass, which in turn further improves the acceptance of drinking straws using the coated glass tube body.

The tube base body is made of or consists of glass, preferably soda-lime glass, borosilicate glass or even quartz glass. Such materials are ecologically friendly and suitable for multiple use.

According to a further preferred embodiment, the coating for the tube base body comprises a polymeric material, which is selected from the group of silanes, silicone oils, halogenated hydrocarbons like Teflon®, and anorganic-organic hybrid polymers. A preferred example of anorganic-organic hybrid polymers are materials known by the tradename Ormocer® (https://www.ormocere.de); such materials exhibit in general excellent temperature resistance and thermal shape stability, excellent adherence to a plurality of materials, and many other beneficial properties (see e.g. U.S. Pat. No. 7,687,654 B2).

The mentioned materials are easy in handling, and furthermore, there are suitable to be applied to glass. If a coating of e.g. silanes or silicone oils on glass is tempered at high temperatures, a bonding is formed between said coatings and glass, and hence, such coating is very durable and is suitable for multiple cleanings. Anorganic-organic hybrid polymers like Ormocer® also have excellent durability when coated on glass. Such anorganic-organic hybrid polymers like Ormocer® have further an excellent abrasion resistance and dishwasher resistance when coated on glass.

Further suitable materials for the hydrophobic polymeric coating are manganese oxide polystyrene composite materials (e.g. in nano-composite form), zinc oxide polystyrene composite materials (again e.g. in nano-composite form), precipitated calcium carbonate combined with fatty acids and/or triglycerides, carbon-nanotube structures, silica nano-coatings and fluorinated silanes.

Further, said coating additionally contains at least one antibacterial agent, more preferably selected from the group consisting of silver and copper and their compounds. For example, silver can be present in its elemental or colloidal form, or could even be silver nitrate. Titanium dioxide is also a suitable biocide, as it decomposes organic compounds under influence of UV-light. The application of UV-light for cleaning purposes can be also easily accomplished. Such further antibacterial properties further improve the hygienic requirements of the gastronomy despite multiple uses.

A glass tube preferably has a thickness between 0.8 mm and 3 mm, a length between 100 mm and 350 mm, more preferably between 120 and 300 mm, and the tube body preferably has a straight cylindrical shape or an angled cylindrical shape. Preferably, the tube has an inner diameter between 3 and 10 mm, more preferably between 5 and 8 mm. Preferably, the tube having a wall thickness between 0.8 and 3 mm, preferably between 1 and 2 mm. Preferably, the coating has a thickness of between 0.1 μm and 1000 μm, more preferably between 1 μm and 500 μm, most preferably between 10 μm and 100 μm Hence, the production of such tubes is easy, and furthermore, due to the simple geometry of the tube, the hydrophobic coating can be evenly and continuously applied without the danger of any accumulations of coating liquid and/or thickenings or bulges.

The present invention further provides a process for producing a coated glass tube comprising the steps of providing a glass tube body, providing a solution or suspension containing hydrophobic polymer material, contacting the tubular body in the solution or suspension provided in the previous step with at least the inner surface of the tubular body, optionally drying the tubular body, and heating the tube.

Such heating treatment is a so-called tempering, wherein the coating substance, such as the polymeric materials mentioned above, can form bonds with the glass and particularly the glass surface, which results in the fact that the obtained coated glass being very durable without the danger that the coating could be removed, decomposed or even scratched off the glass.

The aqueous solution or suspension for coating contains 0.5 to 10% by weight of hydrophobic polymer material, preferably 1.0 to 2.0% by weight. The solvent is preferably water.

The specifically selected concentration of the hydrophobic polymer is particularly preferred since a suitable viscosity range can be adjusted in a manner good for the coating step, so that the tube base body is homogenously contacted and wetted, and the solution or suspension containing the hydrophobic polymer drips off the tube base body without forming bulges or remainders.

Preferably the hydrophobic polymer material is selected from the group consisting of silanes, silicone oils, halogenated hydrocarbons and anorganic-organic hybrid polymers.

Preferably, the solution containing hydrophobic polymer material further contains an antibacterial agent.

Preferably, the antibacterial agent is selected from the group consisting of silver and copper and their compounds. More preferably the antibacterial agent is silver and is elemental or colloidal. Most preferably, the antibacterial agent is silver nitrate.

Preferably, a temperature of at least 100° C., more preferably at least 200° C., most preferably at least 250° C., is used in the heating step.

Preferably, the heating step is carried out for at least 5 minutes, more preferably at least 15 minutes, even more preferably at least 30 minutes, most preferably at least 60 minutes.

This invention also relates to the use of a hydrophobic coating for drinking straws made of glass. Preferably, the hydrophobic coating is selected from the group consisting of silanes, silicone oils and halogenated hydrocarbons.

In the disclosure of the following preferred, but non-limiting embodiments of the invention are described in detail, also by referenced enclosed drawings.

Figure 1:
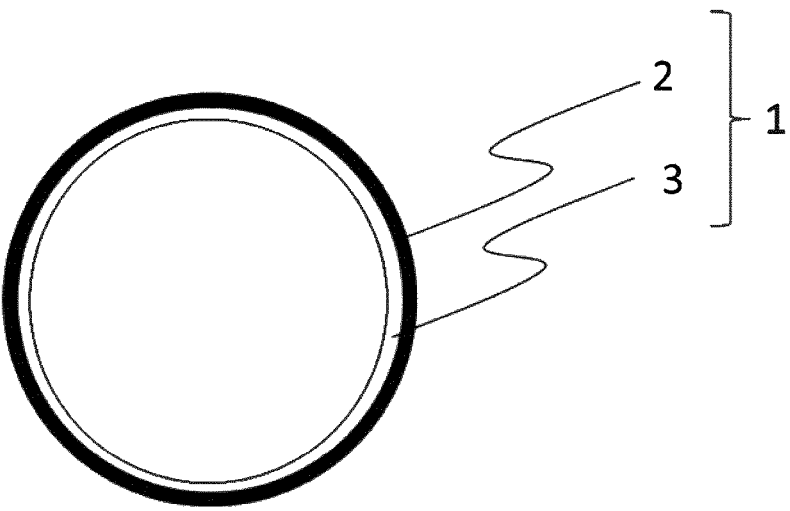
FIG. 1 is a cross-sectional view of a first embodiment of a glass tube according to the present invention.

FIG. 1 shows a cross-sectional view of the tube 1 according to a first embodiment of the present invention, comprising a tube base body 2 and a hydrophobic coating 3. Herein, it is shown that the hydrophobic coating 3 is applied to the inner surface of the tube base body 2. Herein, the hydrophobic coating can consist of a silane, a silicone oil, a halogenated hydrocarbon or an anorganic-organic hybrid polymer as disclosed herein.

For example, silicone oils by the company Wacker can be used. Said silicone oils have a very efficient cost-benefit ratio and allow for easy handling, and a good hydrophobization of a surface can be achieved.

Furthermore, different types of Dynasilan® fabricated by Evonik Industries can be used, which provide excellent hydrophobic properties.

Furthermore, different types of Baysilon® M100 can be used.

Furthermore, chlorinated or chlorinated hydrocarbons could serve as coating, for example Teflon®.

Another particular embodiment to be exemplified for the hydrophobic coating are different types of anorganic-organic hybrid polymers like Ormocer®. Such hybrid polymeric materials can be synthesized by a sol-gel process according to which the monomer or pre-condensed components (in general, optionally organo-modified silanes, partially in combination with additional metal-alkoxy compounds and/or other compounds) are subjected to hydrolysis and condensation of the appropriate groups (see U.S. Pat. No. 7,687,654 B2).

For example, via a targeted hydrolysis and a condensation of organically modified Si-alkoxides, an anorganic network is primarily built. Furthermore, a co-condensation with other metal alkoxides, e.g. Ti, Zr or Al-alkoxides, is also possible. In a subsequent step, the polymerizable groups fixed to an anorganic network are cross-linked to each other. Furthermore, organically modified Si-alkoxides can be used, which do not participate in any organic polymerization reaction and hence contribute to an organic functionalization of anorganic networks. Such polymers can be used for functionalization of surfaces to a great extent.

Figure 2:
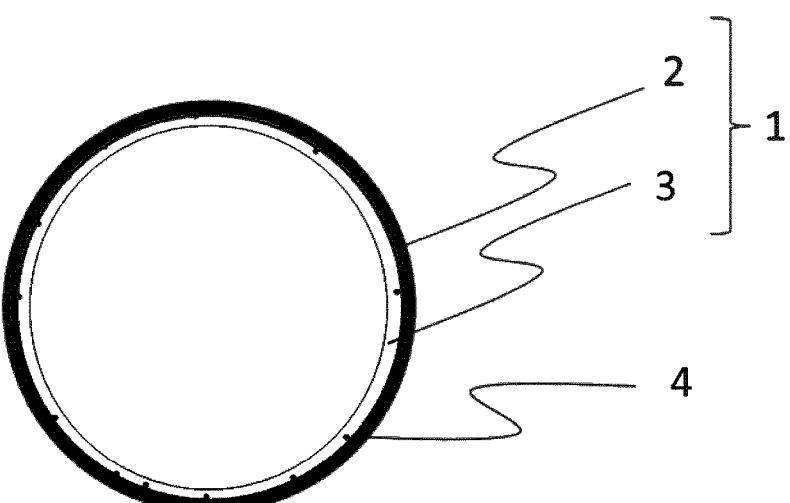
FIG. 2 is a cross-sectional view of the second embodiment of a glass tube according to the present invention.

FIG. 2 shows a second embodiment of the present invention. Herein, antibacterial agents 4 are incorporated in the coating 3. Said antibacterial agents can be provided as particles of a material selected from the group comprising silver, copper and their respective compounds and titanium dioxide. For example, elemental or colloidal silver can be incorporated into the coating 3. Also, the antibacterial agent can be silver nitrate, which however can be solved and homogenously distributed in the coating 3.

Figure 3:
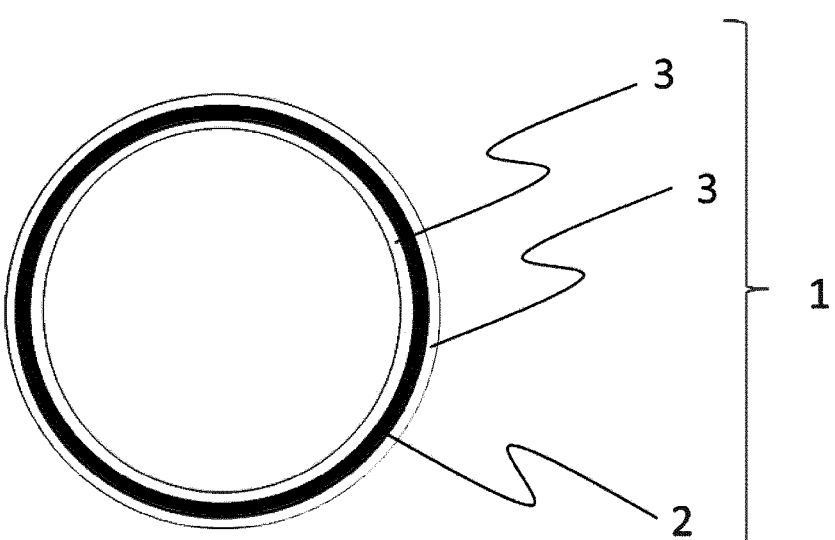
FIG. 3 is a cross-sectional view of the third embodiment of a glass tube according to the present invention.

FIG. 3 shows a further embodiment of the present application, which shows a coating layer 3 inside and outside the tube base body. In this case, the whole drinking straw would be protected with a hydrophobic coating 3.

In the following, furthermore a process for the production of a coated glass tube according to one of the three above depicted embodiments should be presented.

Said process provides the step of providing a glass tube body 2 and a solution or suspension containing a hydrophobic polymer material, said hydrophobic polymer material defined as above. Then, the tubular body is contacted with the solution or suspension, at least the inner surface of the tubular body is contacted. With regard to the third embodiment, the whole glass tube body is contacted with the solution or suspension comprising a hydrophobic polymer material.

Afterwards, the tubular body is optionally dried.

Finally, the tubular body is heat-treated, typically at a relatively high temperature still acceptable for the coating material, for example at a temperature of at least 200° C., more preferably at least at 250° C., even more preferably at least at 300° C. in order to fix the coating to the glass surface. The heat treatment time is typically at least 5 minutes, preferably at least 15 minutes, more preferably at least 30 minutes, even more preferably at least 60 minutes. To obtain a viscosity beneficial for the coating process, the aqueous solution contains between 0.5 to 10%-wt. of the hydrophobic polymer material, preferably 1.0 to 2.0%-wt. The solvent is preferably water. However, also other solvents, in particular organic solvents, are possible.

Preferably, the contacting of the glass tube body and the solution or suspension comprises immersing the tube 2 in the solution. This dip coating is very easy and cheap, and furthermore, the whole surface of the drinking straw can be contacted with hydrophobic polymer solution or suspension.

In another embodiment, the solution or suspension comprising the hydrophobic polymer is vaporized and sprayed onto the glass tube. If only the inner side should be contacted, a spraying nozzle might be inserted into the glass tube body and moved along the glass tube body in order to guarantee homogenous coating.

In another alternative embodiment, the glass tube base body is contacted with the hydrophobic polymer by a surface diffusion process.

The present invention is not limited to the above-mentioned embodiments. The tube, by virtue of a correspondingly shaped tube base body, can also have a triangular, square or rectangular cross-section, even a polygonal or elliptic cross-section.

Also, it is possible to only apply the hydrophobic coating to a part of the interior of the tube, hence for example, a certain range can be un-coated, for example 0.5 cm at the upper and the lower end.

The tubes according to the present invention can be highly beneficially applied as drinking straws.

The invention claimed is:

1. Process for producing a coated glass tube comprising the following steps:
   a) providing a glass tubular base body which is hydrophobized per se;
   b) providing a solution or suspension containing a hydrophobic polymer material;
   c) contacting the glass tubular base body and the solution or suspension provided in step b) with at least an inner surface of the glass tubular base body by immersing the glass tubular base body in the solution or suspension;
   d) optionally drying the glass tubular base body obtained in step c);
   e) heat treating the glass tubular base body obtained in step c),
   wherein the hydrophobized glass tubular base body is a silanized glass tubular base body.

2. Process according to claim 1, wherein the solution provided in step b) is a solution containing 0.5 to 10% by weight of hydrophobic polymer material, and/or wherein the hydrophobic polymer material is selected from the group consisting of silanes, silicone oils, halogenated hydrocarbons and inorganic-organic hybrid polymers.

3. Process according to claim 2, wherein the solution provided in step b) is an aqueous solution containing 0.5 to 10% by weight of hydrophobic polymer material dissolved or dispersed in water.

4. Tube obtained by the process of claim 2 for use as a drinking straw with a tube base body which is made of or consists of glass,
   wherein at least an inside of the glass tube base body is at least partially covered with a hydrophobic coating,
   wherein the glass tube base body per se is hydrophobized, at least inside portions of the glass tube base body are at least partially covered by the hydrophobic coating,
   wherein the coating additionally contains an antibacterial agent, and
   wherein the hydrophobized glass tube base body is a silanized glass tube base body.

5. Tube according to claim 4, wherein the inside of the tube base body is fully covered with the hydrophobic coating.

6. Tube according to claim 4, wherein the silanized glass tube base body is made of soda lime glass, borosilicate glass or quartz glass.

7. Tube according to claim 4, wherein the coating comprises a hydrophobic polymeric material, wherein the hydrophobic polymeric material is selected from the group consisting of silanes and silicone oils.

8. Tube according to claim 4, wherein the antibacterial agent is selected from the group consisting of silver, copper, and their compounds.

9. Tube according to claim 8, wherein the antibacterial agent is selected from the group consisting of elemental silver, colloidal silver, or silver nitrate.

10. Tube according to claim 4, the silanized glass tube base body having an inner diameter between 3 and 10 mm, and/or a wall thickness between 0.8 and 3 mm, and/or a length between 100 and 350 mm, and/or wherein the coating has a thickness of between 0.1 μm and 1000 μm.

11. Tube according to claim 4, the silanized glass tube base body having a straight cylindrical shape or an angled cylindrical shape or a kinked cylindrical shape.

12. Tube according to claim 4, wherein the coating comprises a hydrophobic polymeric material, wherein the hydrophobic polymeric material is selected from the group consisting of halogenated hydrocarbons and hydrophobic inorganic-organic hybrid polymers.

13. Process according to claim 1, the solution in step b) further containing an antibacterial agent.

14. Process according to claim 13, wherein the antibacterial agent is selected from the group consisting of silver, copper and their compounds.

15. Process according to claim 14, wherein the antibacterial agent is selected from elemental silver, colloidal silver, or silver nitrate.

16. Process according to claim 1, wherein in step d) a temperature of at least 200° C. is used, and/or wherein the heat treatment in step d) is carried out for at least 5 minutes.

17. Process according to claim 1, wherein step c) comprises immersing the silanized glass tubular base body in the solution provided in step b) or vaporizing the silanized glass tubular base body with the solution provided in step b) or surface diffusion.

\* \* \* \* \*